US008827172B2

(12) United States Patent
Habermann

(10) Patent No.: US 8,827,172 B2
(45) Date of Patent: Sep. 9, 2014

(54) THERMOSTAT VALVE

(75) Inventor: Rolf Habermann, Bergen (DE)

(73) Assignee: ITW Automotive Products GmbH, Iserlohn (DE)

( * ) Notice: Subject to any disclaimer, the term of this patent is extended or adjusted under 35 U.S.C. 154(b) by 685 days.

(21) Appl. No.: 13/124,856

(22) PCT Filed: Nov. 5, 2009

(86) PCT No.: PCT/IB2009/054927
§ 371 (c)(1),
(2), (4) Date: Apr. 19, 2011

(87) PCT Pub. No.: WO2010/052666
PCT Pub. Date: May 14, 2010

(65) Prior Publication Data
US 2011/0198518 A1  Aug. 18, 2011

(30) Foreign Application Priority Data
Nov. 6, 2008 (DE) .......................... 10 2008 056 245

(51) Int. Cl.
*G05D 23/02* (2006.01)
(52) U.S. Cl.
USPC .......................... 236/93 R; 236/99 J; 236/100
(58) Field of Classification Search
USPC .... 236/42, 93 R, 93 A, 92 B, 93 B, 95, 99 R, 236/100, 1 A, 9 A, 49.3, DIG. 9; 379/68, 379/88.1
See application file for complete search history.

(56) References Cited

U.S. PATENT DOCUMENTS 5,292,064 A * 3/1994 Saur et al. ..................... 236/34.5
8,137,307 B2 * 3/2012 Tennican et al. ................ 604/89
2006/0108435 A1 * 5/2006 Kozdras et al. ............. 236/93 R

FOREIGN PATENT DOCUMENTS

DE    4237036 C1    5/1994
EP    0908809 A1    4/1999
EP    1717499 A1   11/2006

OTHER PUBLICATIONS

ISR for PCT/IB2009/054927 dated Mar. 4, 2010.

* cited by examiner

*Primary Examiner* — Marc Norman
(74) *Attorney, Agent, or Firm* — Lowe Hauptman & Ham LLP

(57) ABSTRACT

A valve fitted with a housing which comprises at least two mutually apart coolant hookups, and a thermally expansible device, including a housing and a push-rod and resting on the housing and operating in concert with a valve element that in turn operates in concert with an annular valve seat, said valve seat being situated between the two hookups, and a spring that biases the valve element toward the valve seat, wherein the valve element is in the form of an annular valve disk made by two-part injection molding, where one annular sealing portion is made of an elastomeric plastic and the remaining valve disk is made of a hard plastic, the outer sealing portion cooperating with the valve seat and the inner sealing portion cooperating in a sealing manner with a housing of the thermally expansible device.

16 Claims, 2 Drawing Sheets

THERMOSTAT VALVE

RELATED APPLICATIONS

Figure 1:
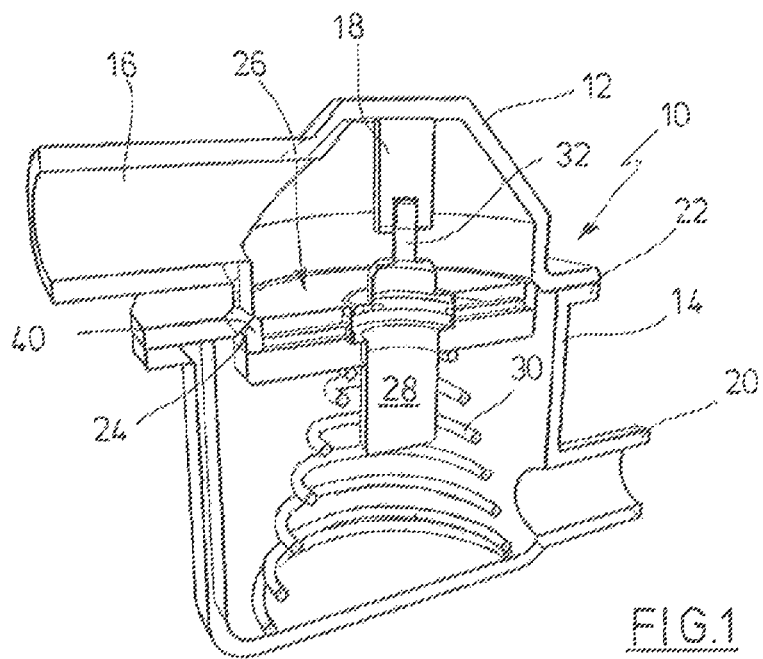

The present application is national phase of PCT/IB2009/054927 filed Nov. 5, 2009, and claims priority from German Application Number 10 2008 056 245.9, filed Nov. 6, 2008.

The present invention relates to a thermostatic valve defined in claim 1.

Thermostatic valves are used wherever a fluid flow must be regulated as a function of the fluid's temperature. An especially wide field of application are internal combustion engine cooling systems, in particular those used for cars. So-called thermally expansible devices are widely used to drive a valve element. Said devices consist of a housing enclosing a liquid or a wax of which the volume is a strong function of temperature changes. Depending on the volume, a pushrod is commensurately driven out of the thermally expansible device housing. Typically such a thermally expansible device rests on a support in the thermostatic valve housing while its other end operates in concert with a valve element. In turn said valve element works in concert with a valve seat in the thermostatic valve housing to selectively connect/disconnect hook-ups at the thermostatic valve housing.

The manufacture and assembly of conventional thermostatic valves is fairly expensive. Accordingly it is the objective of the present invention to create a thermostatic valve composed of simple means and offering low-cost manufacture.

This objective is attained by the features of claim 1.

In the present invention, the valve element is in the form of a annular valve disk made by two-part injection molding. An elastomeric annular plastic sealing portion is configured on the external circumference of said valve disk; furthermore an annular seal made of the same plastic is configured at the inside of the annular sealing portion. The external sealing portion cooperates with the valve seat and the inner one seals off the cylindrical housing portion of the thermally expansible device due to being inserted into the aperture of the annular valve disk.

An integral valve element is produced by manufacturing sealing segments at the valve seat using two-part injection molding, said valve element cooperating with the valve seat respectively the thermally expansible device without resort to separate seals. The thermally expansible device merely is inserted during assembly into the aperture of the annular valve disk. The inner seal, preferably in the form of a sealing bead, rests against the thermally expansible device and in this manner seals it off.

The remainder of the valve disk is made of a hard plastic which, in one embodiment mode of the present invention, may be fitted with a helical recess receiving and keeping in place a conical valve spring. In this manner a pre-assembled unit of valve disk, thermally expansible device and valve spring may be made and then be integrated into the housing.

Inner and outer sealing segments of a further embodiment mode of the present invention are connected to each other by at least one radial stub. In the course of injection molding, first the soft-plastic part consisting of an inner and outer sealing portion and radial stub is made. Next the hard plastic is injected around this sub-assembly.

An illustrative embodiment of the present invention is elucidated below in relation to the appended drawings.

Figure 2:
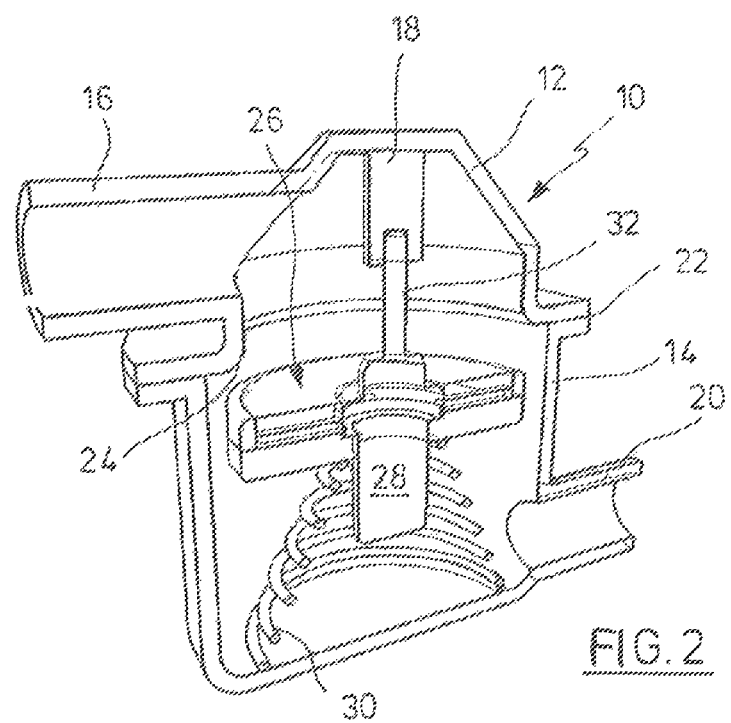
Figure 3:
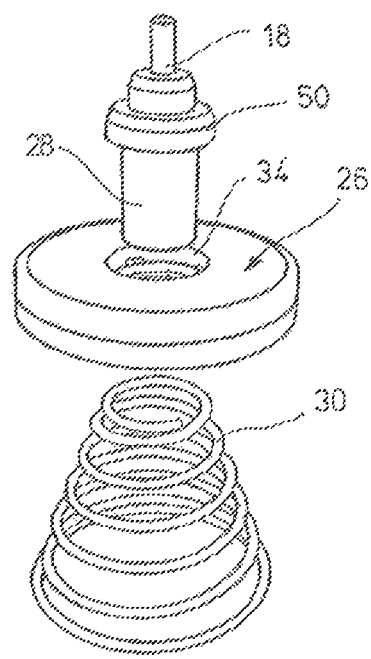
Figure 5:
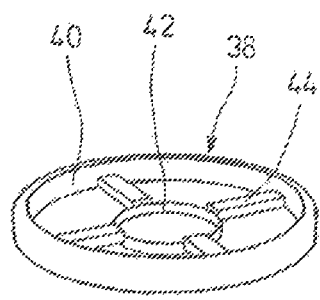
Figure 4:
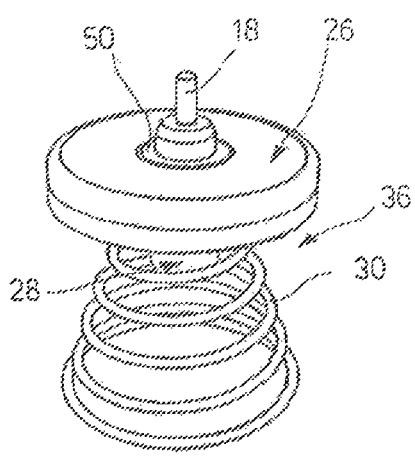
Figure 6:
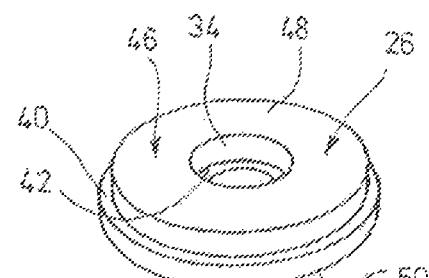

FIG. 1 is a sectional perspective of a thermostatic valve of the present invention in its closed state, FIG. 2 shows the thermostatic valve of FIG. 1 in its open state, FIG. 3 is an exploded perspective view of a prefabricated unit for the thermostatic valve of FIG. 1 or 2, FIG. 4 shows the prefabricated unit of FIG. 3, FIG. 5 shows the soft, elastomeric plastic part of a valve disk of FIGS. 1 and 2, and FIG. 6 shows the valve disk after final injection molding.

FIGS. 1 and 2 show a thermostatic valve 10 of which the housing comprises an upper segment 12 and a lower segment 14. The upper segment 12 comprises a first coolant hookup 16 and an axial attachment 18 projecting axially downward from the ceiling of the upper housing segment 14. The lower housing segment 12 comprises a second coolant hookup 20. The housing segments 12, 14 are joined to each other by a flange 22. The housing segments 12, 14 are made of an appropriate plastic. Lastly, the upper housing segment includes an annular, conical valve seat 24.

A valve disk 26 is configured in the housing of the thermostatic valve 10 and receives a thermally expansible device 28. The valve disk 26 is forced toward the valve seat 24 by means of a conical compression spring 30. The spring 30 rests against the base of the lower housing segment 14.

A pushrod 32 of the thermally expansible device 28 rests against the axial attachment 18. FIG. 2 indicates that said pushrod has moved farther out of the thermally expansible device 28, as a result of which the valve disk 26 was lifted off the valve seat 24. Consequently this configuration allows coolant flow in both directions between the hookups 20 and 16.

FIGS. 3 and 4 indicate that, during pre-assembly, the cylindrical housing of the thermally expansible device 28 can be inserted into an inner aperture 34 of the annular valve disk 26. The underside of the annular valve disk 28 is connected to the upper end of the conical valve spring 30, for instance using screw means. As a result and as shown in FIG. 4, a pre-assembled unit 36 comes into being and is insertable into the housing of the thermostatic valve 10.

The valve disk 26 is made by two-part injection molding. A first part 38 consists of a sealing annulus 40 and an inner sealing annulus 42, said annuli being connected to each other by four radial stubs 44 equidistant from one another by 90°. The part 38 is made by elastomeric injection molding. The second part 46 is made of a hard, injection-molded plastic molded around the part 38. As shown in FIG. 6, said second part 46 constitutes a flat upper annular portion 48 and a lower flat annular portion 50, the outer seal 40 and the inner annular seal 42 running between said two annular portions. The outer annular seal radially slightly projects beyond the part 46. The same feature also applies to the beaded, inner annular seal 42 which enters the aperture 34. The housing of the thermally expansible device 28 comprises a radial flange 50. In the position shown in FIG. 4, the flange 50 rests against the inner annular seal 42. The height of the flange 50 is selected in a manner that it terminates at the top side of the part 40 of the valve disk 26 as indicated in FIG. 4. In other words, the valve disk respectively the parts 38, 46 are selected to attain a configuration such as shown in FIG. 4.

When the valve disk 26 is in its closed position as shown in FIG. 1, the outer sealing annulus 40 rests against the valve seat 24 to seal off the thermostatic valve.

Where a controlled bypass is needed, a bypass aperture may be fitted into the lower housing segment 14, the casing of the thermally expansible device 28 then jointly with said aperture constituting a valve.

The invention claimed is:

1. A thermostatic valve fitted with a housing which comprises at least two mutually apart coolant hookups, further with a thermally expansible device, comprising:

a housing;

a push-rod attached to the housing and operating in concert with a valve element that in turn operates in concert with an annular valve seat, said valve seat being situated between the two hookups; and a spring that biases the valve element toward the valve seat, wherein the valve element is in the form of an annular valve disk made by two-part injection molding, where one annular sealing portion is made of an elastomeric plastic and the remaining valve disk is made of a hard plastic with an outer sealing portion cooperating with the valve seat and an inner sealing portion cooperating in a sealing manner with a housing of the thermally expansible device when said thermally expansible device is received in the aperture of the annular valve disk.

2. The thermostatic valve as claimed in claim 1, characterized in that the inner sealing portion projects bead shaped into the aperture.

3. The thermostatic valve as claimed in claim 1, characterized in that the housing of the thermally expansible device is fitted with a radial flange which operates in concert with the inner sealing portion.

4. The thermostatic valve as claimed in claim 1, characterized in that the inner and outer sealing portions are connected to each other by at least one radial, soft-plastic stub.

5. The thermostatic valve as claimed in claim 1, characterized in that the valve spring is a conical compression spring and the valve disk further comprises, at its side facing said conical compression spring, a recess which receives and keeps in place the facing end of the conical compression spring.

6. The thermoplastic valve of claim 1, wherein the annular valve disk has a thickness in a longitudinal direction thereof that is less than a maximum diameter in a lateral direction thereof.

7. The thermoplastic valve of claim 1, wherein the annular valve disk has a through bore extending completely through in the longitudinal direction thereof.

8. The thermoplastic valve of claim 1, wherein the annular valve disk has a through bore extending completely through in the longitudinal direction thereof, and wherein the thermally expansible device extends completely through the through bore.

9. The thermoplastic valve of claim 8, wherein the thermally expansible device extends completely through the through bore such that opposite ends of the thermally expansible device are proud of opposite surfaces of the annular valve disk.

10. The thermoplastic valve of claim 1, wherein the spring and the annular valve disk are non-overlapping in a longitudinal direction of the annular valve disk.

11. The thermoplastic valve of claim 1, wherein a face of the spring abuts a lowermost face of the annular valve disk.

12. The thermoplastic valve of claim 1, wherein all portions of the annular valve disk are located above all portions of the spring.

13. The thermoplastic valve of claim 1, wherein no portion of the annular valve disk is located within the spring.

14. The thermoplastic valve of claim 1, wherein the parts of the annular valve disk are all in the form of a disk.

15. The thermoplastic valve of claim 1, wherein a first part of the annular valve disk that abuts the spring has a larger maximum outer diameter than the maximum outer diameter of a second part of the annular valve disk opposite the spring relative to the first part, the diameters being normal to a longitudinal axis of the annular valve disk.

16. The thermoplastic valve of claim 1, wherein a first part of the annular valve disk that abuts the spring has a maximum outer diameter that is the same as the maximum outer diameter of the second part of the annular valve disk opposite the spring relative to the first part, the diameters being normal to a longitudinal axis of the annular valve disk.

* * * * *